US012803402B2

(12) United States Patent
Choi et al.

(10) Patent No.: US 12,803,402 B2
(45) Date of Patent: Nov. 17, 2026

(54) INDUCTION MOTOR WITH A CIRCUMFERENTIALLY SLITTED SQUIRREL CAGE ROTOR

(71) Applicants: HYUNDAI MOTOR COMPANY, Seoul (KR); KIA CORPORATION, Seoul (KR); IUCF-HYU (Industry-University Cooperation Foundation Hanyang University), Seoul (KR)

(72) Inventors: Jin Ho Choi, Suwon-si (KR); Jong Seok Lee, Suwon-si (KR); Sung Woo Hwang, Seoul (KR); Myung Seop Lim, Seoul (KR); Jae Hyun Kim, Seoul (KR)

(73) Assignees: HYUNDAI MOTOR COMPANY, Seoul (KR); KIA CORPORATION, Seoul (KR); IUCF-HYU (Industry-University Cooperation Foundation Hanyang University), Seoul (KR)

( * ) Notice: Subject to any disclaimer, the term of this patent is extended or adjusted under 35 U.S.C. 154(b) by 85 days.

(21) Appl. No.: 18/962,848

(22) Filed: Nov. 27, 2024

(65) Prior Publication Data

US 2025/0096660 A1 Mar. 20, 2025

Related U.S. Application Data

(62) Division of application No. 17/889,804, filed on Aug. 17, 2022, now abandoned.

(30) Foreign Application Priority Data

Nov. 30, 2021 (KR) ........................ 10-2021-0169466

(51) Int. Cl.
*H02K 17/18* (2006.01)

(52) U.S. Cl.
CPC .................................... *H02K 17/18* (2013.01)

(58) Field of Classification Search
CPC ........ H02K 17/18; H02K 17/168; H02K 7/16; H02K 15/0002

(Continued)

(56) References Cited

U.S. PATENT DOCUMENTS 2,944,171 A * 7/1960 Alger ..................... H02K 17/20 310/211
3,013,168 A * 12/1961 Ellis ....................... H02K 99/20 310/216.013

(Continued)

FOREIGN PATENT DOCUMENTS

CN 1142701 A * 2/1997 ............. H02K 1/278
CN 107370319 A 11/2017

(Continued)

OTHER PUBLICATIONS

Machine Translation of JP H0865931 A (Year: 1996).*

(Continued)

*Primary Examiner* — Alexander A Singh
*Assistant Examiner* — Charlie Frank Mann, Jr.
(74) *Attorney, Agent, or Firm* — Lempia Summerfield Katz LLC

(57) ABSTRACT

A rotor for an induction motor is provide. The rotor includes a core built with stacks of a plurality of steel sheets and includes a plurality of rotor slots that are radially arranged. The rotor further includes a plurality of conductor bars contained in the plurality of rotor slots, respectively, and end-rings attached to both longitudinal ends of each of the plurality of conductor bars. The rotor further includes at least one slit formed inward from an outer periphery of the (Continued)

rotor along a perimeter of the rotor, wherein the slit has a depth deep enough to form a groove portion in at least some region of each of the plurality of conductor bars.

4 Claims, 11 Drawing Sheets

(58) Field of Classification Search
USPC ......... 310/211, 212, 156.78, 156.79, 156.82, 310/156.83
See application file for complete search history.

(56) References Cited

U.S. PATENT DOCUMENTS 4,409,506 A * 10/1983 Ito ........................ H02K 17/168 310/216.004
4,644,210 A * 2/1987 Meisner ................. H02K 9/197 310/211
4,751,417 A * 6/1988 Krinickas, Jr. .......... H02K 1/06 29/598
9,806,589 B2 10/2017 Komatsu et al.
2013/0020899 A1 * 1/2013 Kleber ................. H02K 15/023 29/598
2016/0164387 A1 6/2016 Komatsu et al.

FOREIGN PATENT DOCUMENTS

EP 2658095 A1 * 10/2013 ............. H02K 1/278
JP H0865931 A * 3/1996
JP H09289761 A 11/1997
JP 3453072 B2 10/2003
JP 5774255 B1 7/2015
KR 102285277 B1 8/2021

OTHER PUBLICATIONS

Machine Translation of EP 2658095 A1 (Year: 2013).*
Machine Translation of CN 1142701 A (Year: 1997).*
Office Action cited in corresponding Korean patent application No. 10-2021-0169466; Sep. 13, 2025; 8 pp.

* cited by examiner

FIG. 5A – Prior Art
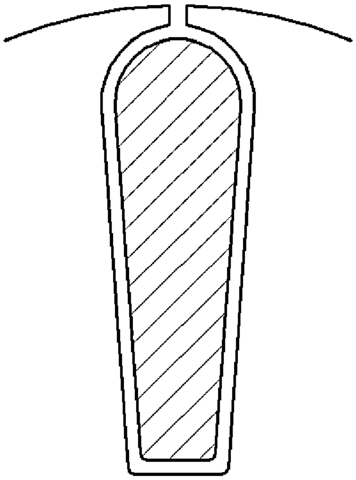
FIG. 5B – Prior Art
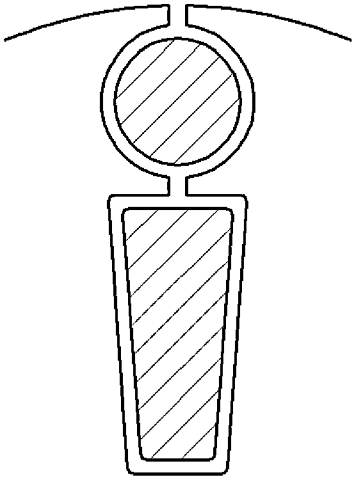

INDUCTION MOTOR WITH A CIRCUMFERENTIALLY SLITTED SQUIRREL CAGE ROTOR

CROSS-REFERENCE TO RELATED APPLICATION

This application is a divisional of U.S. application Ser. No. 17/889,804 filed on Aug. 17, 2022, which claims priority to and the benefit of Korean Patent Application No. 10-2021-0169466 filed on Nov. 30, 2021, the disclosures of which are incorporated herein by reference in their entirety.

TECHNICAL FIELD

The present disclosure relates to an induction motor with a circumferentially slitted rotor.

BACKGROUND

The description in this section merely provides background information related to the present disclosure and does not necessarily constitute the prior art.

Whereas industrial induction motors generally rotate at a constant speed, induction motors for vehicles run at variable speeds, i.e., start and stop operations occur frequently and repeatedly. Since induction motors for vehicles are run on a battery, they require high efficiency to cover travel distances. To increase efficiency, the speed of induction motors for vehicles is becoming increasingly higher. Incidentally, the induction motors for vehicles are exposed for long periods of time to vibration produced on startup and external excitation from driving the vehicle. In line with the trend toward higher speeds, these factors need to be considered in terms of design to ensure the durability of the rotor.

In induction motors, the mechanical rotation rate of the rotor and the rotation rate of the stator's rotating field do not match, unlike in synchronous motors. Also, the torque varies depending on the difference in rotation speed between the stator's rotating field and the rotor.

FIG. 1 shows slip-torque characteristics of a typical induction motor of the related art. FIG. 2 shows slip-current characteristics of a typical induction motor of the related art.

The ratio between the rotation rate of the stator's magnetic field and the rotation rate of the rotor is called a "slip," and the slip-torque characteristics of a typical induction motor are as shown in FIG. 1. Torque at startup (i.e., high slip state) is lower than torque in a low slip region which is a main operation area. On the other hand, as exemplified in FIG. 2, generally, the current induced at startup is larger than the current induced during operation, which results in low efficiency.

FIG. 3 shows how typical slip-torque characteristics of an induction motor of the related art change with increasing rotor resistance. FIG. 4 shows how typical slip-current characteristics of an induction motor of the related art change with increasing rotor resistance.

As exemplified in FIG. 3, the slip at which maximum torque is obtained increases in proportion to the resistance of the rotor (secondary side), and the maximum torque itself is constant, which is referred to as a proportional shifting effect in the field of induction motors. Where the secondary side has a larger resistance, more starting torque is produced, and a smaller current is induced at startup.

When an induction motor has a squirrel-cage rotor, the rotor may include deep bars or double squirrel-cage conductor bars, such as those exemplified in FIGS. 5A and 5B, in order to reduce starting current and increase starting torque using this proportional shifting effect.

FIGS. 5A and 5B exemplify a deep bar and a double squirrel-cage conductor bar as a conductor bar included in a rotor of the related art.

The deep bar has the shape of a conductor bar that runs longitudinally from the outer periphery of the rotor to the inner periphery. Thus, leakage reactance increases toward the inner periphery. Since the slip at startup is large, the frequency at the secondary side increases, and currents are concentrated on the outer periphery of the rotor where leakage reactance is small, i.e., in conductive portions on the rotor's surface. Accordingly, the cross-sectional area of the conductors through which current flows is virtually reduced, which is similar in effect to an increase in the resistance of the rotor. This conceptually explains how the starting torque of the induction motor using deep bars is increased.

A squirrel-cage induction motor has a double cage construction in which conductor bars are divided into outer conductors arranged on the outer periphery and inner conductors arranged on the inner periphery. The outer conductors are conductors having higher specific resistance than the inner conductors. The outer conductors and the inner conductors may be connected by a bridge-like member. When the slip at startup is large and the frequency at the secondary side is very high, the ratio of leakage reactance in the impedance at the secondary side is much higher than the ratio of resistance. Thus, at startup, the current at the secondary side is limited by leakage reactance. Therefore, currents are concentrated on the outer conductors where specific resistance is large, leaving little current flowing through the inner conductors. Accordingly, the starting torque may be increased. In the case of a double squirrel-cage, since the specific resistance of the inner conductors is smaller than the specific resistance of the outer conductors, most of the current flows through the inner conductors while the rotor is operating at a rated revolutions per minute (rpm), i.e., when the slip is small and the frequency at the rotor is low, thereby achieving higher efficiency.

The double squirrel-cage may be formed in an empty space where no outer conductors are arranged on the outer periphery—i.e., nothing is charged—for the purpose of reducing eddy currents and also significantly reducing losses caused by pulse width modulation (PWM) in the stator.

Where conductor bars are formed by die casting in holes formed by rotor slots included in stacks of a plurality of steel sheets, constructing a double squirrel cage with different kinds of materials may make manufacturing difficult and increase costs. Also, a rotor with a complicated structure similar to the double squirrel cage may raise a concern about a decrease in durability, due to the increased centrifugal force in high-speed induction motors. Accordingly, it is desirable that the rotor of an induction motor designed to run at high speed has a simple structure.

When there are deep bars, a magnetic flux created in the conductors on the inner periphery follows a long path to pass through air gaps, which may cause losses because of a large amount of magnetic flux leakage flowing toward the slots.

SUMMARY

The present disclosure provides a rotor structure that can increase the starting torque of an induction motor and additionally can improve the cooling effect.

According to at least one embodiment, the present disclosure provides a rotor for an induction motor. The rotor includes a core built with stacks of a plurality of steel sheets and includes a plurality of rotor slots that are radially arranged. The rotor also includes a plurality of conductor bars contained in the plurality of rotor slots, respectively, and end-rings attached to both longitudinal ends of each of the plurality of conductor bars. The rotor further includes at least one slit formed inward from an outer periphery of the rotor along a perimeter of the rotor, wherein the slit has a depth deep enough to form a groove portion in at least some region of each of the plurality of conductor bars.

An induction motor rotor, according to the present disclosure, has the effect of improving the starting torque of the induction motor. Also, the induction motor's characteristics can be easily adjusted by the shape of slits to be made in a post-machining process. Further, as the surface area of the outer periphery of the rotor increases, the cooling characteristics of the rotor can be improved.

BRIEF DESCRIPTION OF THE DRAWINGS

FIGS. 5A and 5B exemplify a deep bar and a double squirrel-cage conductor bar as a conductor bar included in a rotor of the related art.

DETAILED DESCRIPTION

Figure 1:
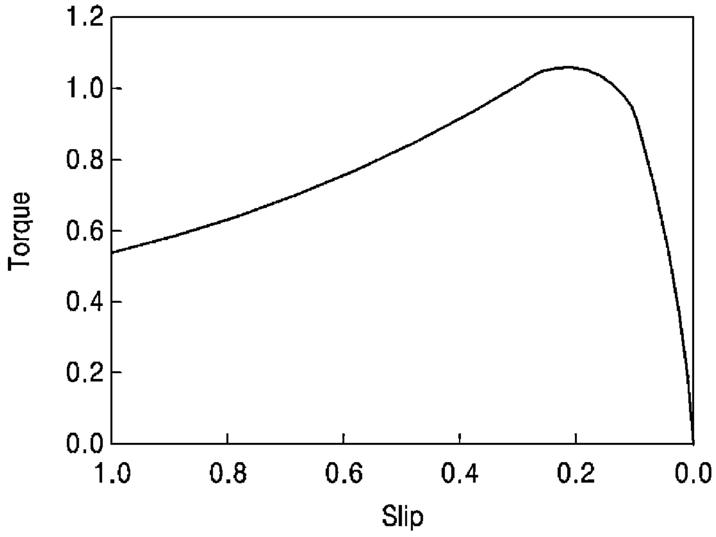
FIG. 1 Prior Art
FIG. 1 shows slip-torque characteristics of a typical induction motor of the related art.
Figure 2:
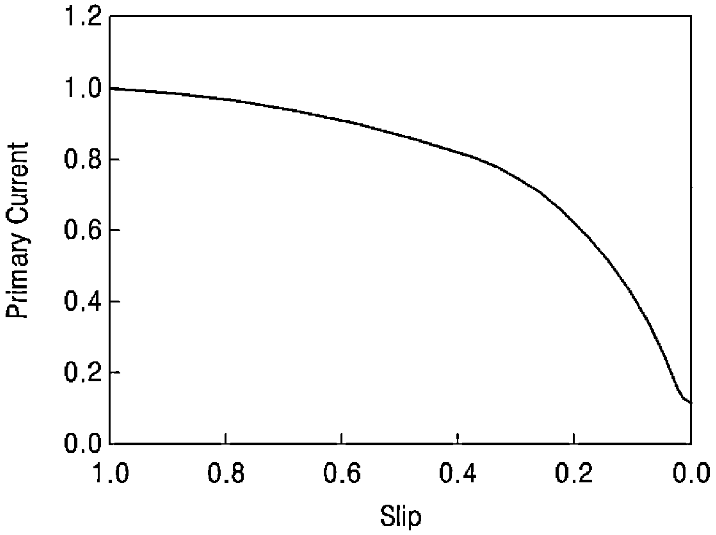
FIG. 2 Prior Art
FIG. 2 shows slip-current characteristics of a typical induction motor of the related art.
Figure 3:
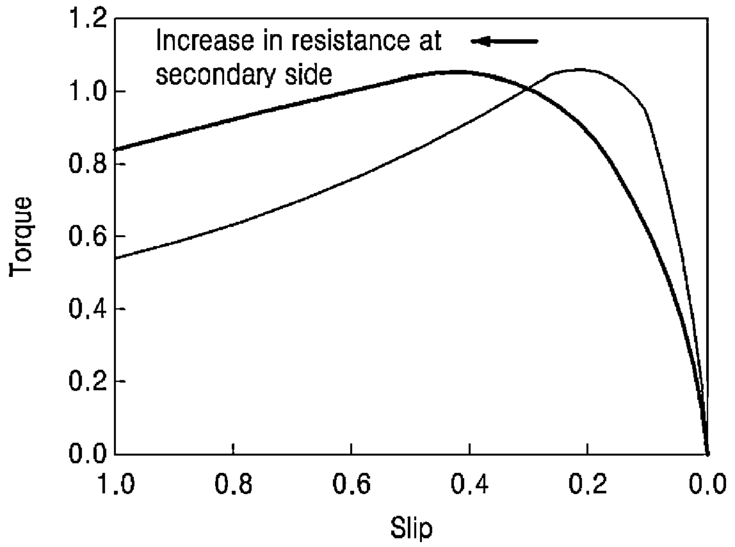
FIG. 3 Prior Art
FIG. 3 shows how, in the related art, typical slip-torque characteristics of an induction motor change with increasing rotor resistance.
Figure 4:
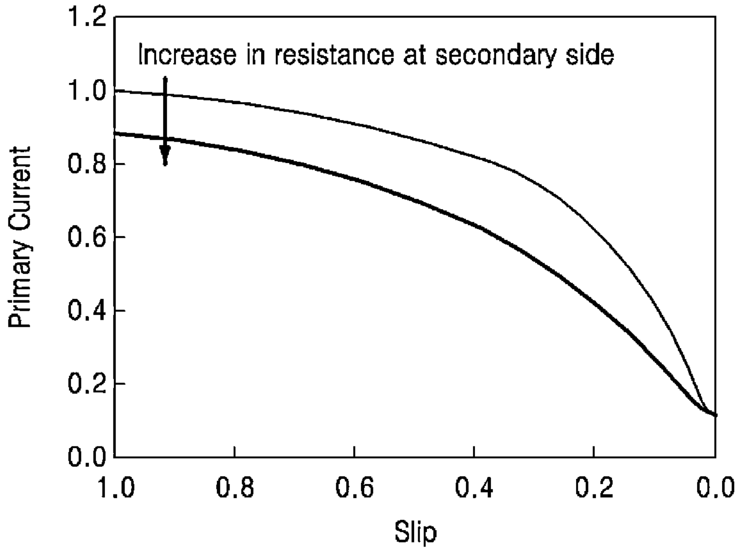
FIG. 4 Prior Art
FIG. 4 shows how, in the related art, typical slip-current characteristics of an induction motor change with increasing rotor resistance.

Some embodiments of the present disclosure are described below with reference to the accompanying drawings. In the following description, like reference numerals preferably designate like elements, although the elements are shown in different drawings. Further, in the following description of some embodiments, a detailed description of known functions and configurations incorporated herein is omitted for the purpose of clarity and for brevity.

Additionally, alphanumeric codes such as first, second, i), ii), a), b), and the like, in numbering components are used solely for the purpose of differentiating one component from the other but not to imply or suggest the substances, the order, or sequence of the components. Throughout this specification, when parts "include" or "comprise" a component, they are meant to further include other components, not excluding thereof unless there is a particular description contrary thereto.

Figure 6A:
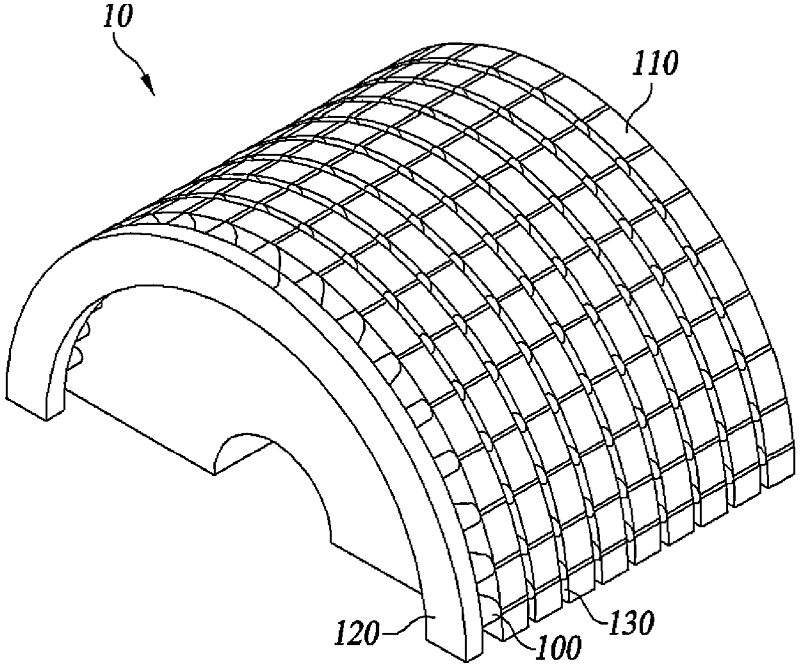
FIGS. 6A and 6B illustrate a rotor comprising a slit on the outer periphery according to an embodiment of the present disclosure.
Figure 6B:
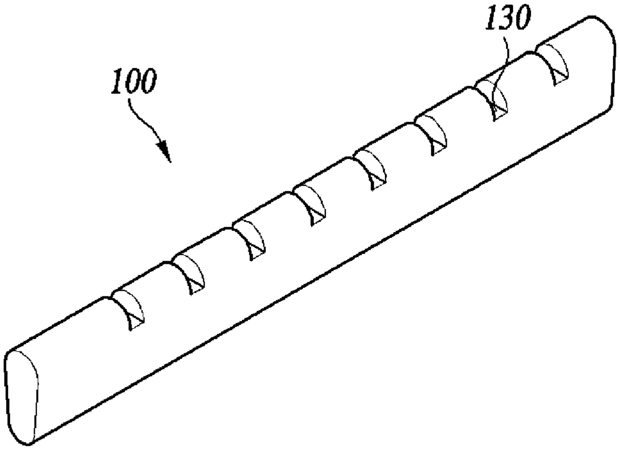

FIGS. 6A and 6B illustrate a rotor comprising a slit on the outer periphery according to an embodiment of the present disclosure. FIG. 6A is a partial perspective view illustrating part of a rotor 10 according to an embodiment. FIG. 6B illustrates a conductor bar 100 according to an embodiment of the present disclosure.

Referring to FIGS. 6A and 6B, a rotor 10 according to an embodiment includes a core 110, a plurality of conductor bars 100, and a pair of end-rings 120.

The core 110 is built with stacks of a plurality of steel sheets comprising a plurality of rotor slots that are radially arranged. The conductor bars 100 are contained in the rotor slots, respectively. The end-rings 120 are attached to both longitudinal ends of each of the conductor bars 100. The rotor 10 of FIG. 6A shows only one end-ring 120 of the pair of end-rings 120, since FIG. 6A is only a partial view of the rotor 10.

The rotor 10, according to an embodiment, further includes at least one slit 130 made into the outer periphery of the rotor 10 around the perimeter of the rotor 10. The slit 130 has a depth deep enough to form a groove portion in at least some region (i.e., a portion) of each of the plurality of conductor bars 100.

The conductor bar 100 is illustrated in FIG. 6B. The conductor bar 100 is shown separately only to describe the slit 130 or the grooved portion formed on the outer periphery of the conductor bar 100. However, the conductor bars 100 each are not preliminarily formed in this manner. The slit 130 (or groove portion) of the conductor bar 100, according to an embodiment, is formed by machining the outer periphery of the rotor 10 in a post-machining process after the preassembling of the rotor 10.

The outer periphery of the conductor bar 100 including the slit 130, according to an embodiment, has a larger resistance due to the slit 130, thereby increasing the starting torque and reducing the starting currents.

Figure 7A:
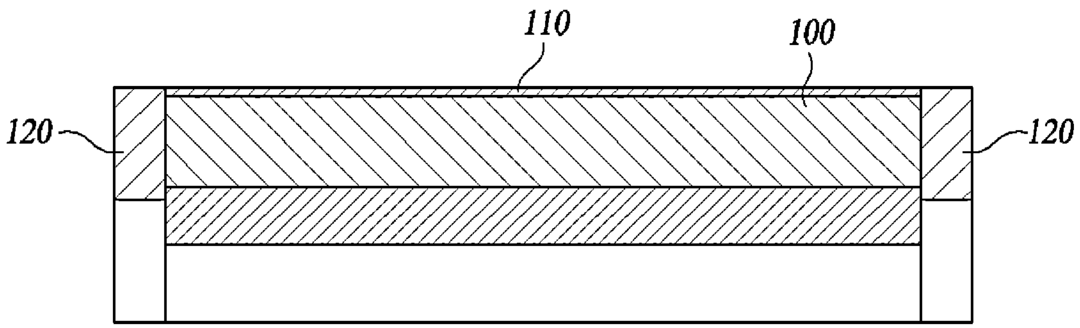
FIGS. 7A and 7B are a cross-sectional views of slits formed in a rotor according to an embodiment of the present disclosure.
Figure 7B:
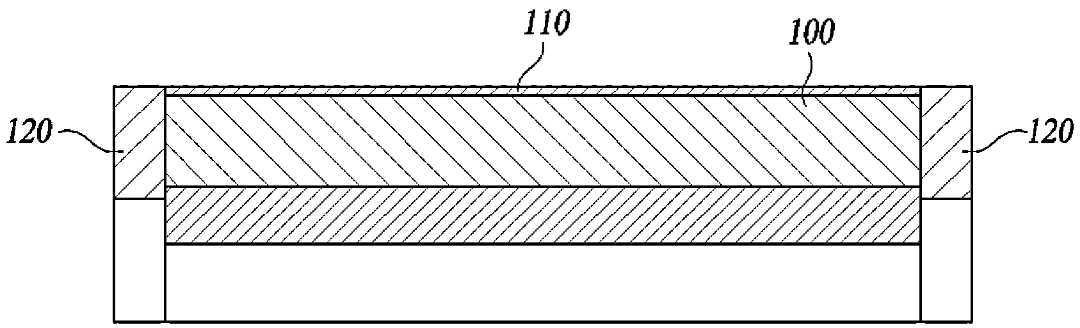

FIGS. 7A and 7B are a cross-sectional views of slits formed in a rotor according to an embodiment of the present disclosure. FIG. 7A is a cross-sectional view of a preassembled rotor 10 taken along the center of symmetry of the conductor bar 100. FIG. 7B is a cross-sectional view of a rotor 10 with slits formed in a post-machining process, taken along the center of symmetry of the conductor bar 100.

A rotor 10, according to an embodiment, is first manufactured by a well-known traditional method, such as the molding of conductor bars by die casting, for example. Next, slits 130 are formed on the outer periphery of the manufactured rotor 10 using a machining method such as cutting machining and wire electrical discharge machining (WEDM), for example. By machining, the slits 130 are formed by removing part of the core 110 and conductor bars 100 of the rotor 10. A plurality of slits 130 are arranged in an axial direction of the rotor 10. This lengthens the path in which currents flow along the outer peripheries of the conductor bars 100 because it follows the shape of the slits 130, thus increasing resistance.

The shape, arrangement, and size of the slits 130 may be selected according to desired motor characteristics.

Figure 8:
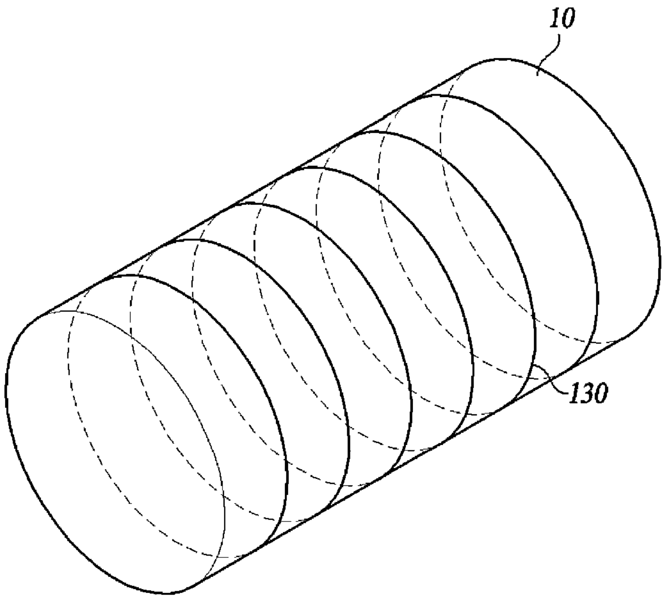
FIG. 8 illustrates slits arranged parallel to one another according to an embodiment of the present disclosure.

FIG. 8 illustrates slits 130 arranged parallel to one another according to an embodiment of the present disclosure.

For the convenience of the description, FIG. 8 schematically illustrates the configuration and positions of slits 130 that simplify the rotor 10, where the slits 130 are arranged parallel to one another. Although the illustrated embodiment shows by example that a plurality of slits 130 are arranged at regular intervals, the arrangement of slits 130 is not limited to this, and the intervals between the slits 130 and the width of the slits 130 may vary. For example, the intervals between the slits 130 near both ends of the rotor 10 may be narrower or wider than the intervals between the slits 130 in a central area of the rotor 10. Similarly, helical slits 132 to be described below may have a fixed pitch, and, if necessary, the helical slits 132 may have different pitches in some regions.

Figure 9:
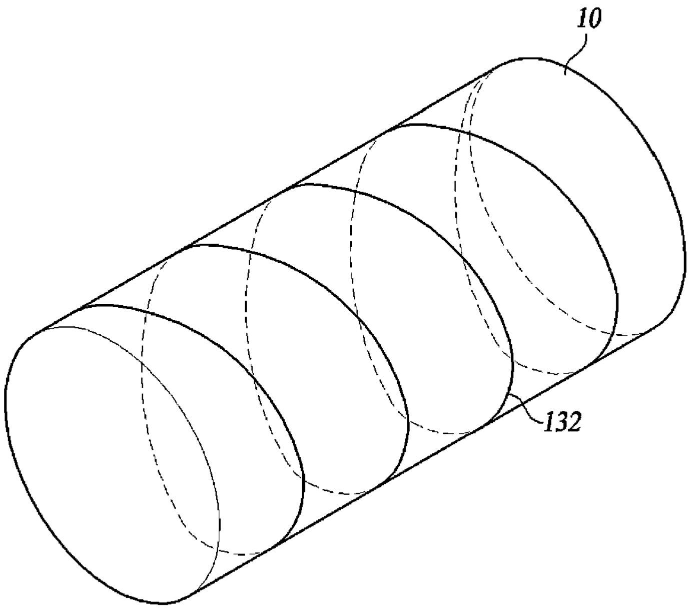
FIG. 9 illustrates helical slits according to an embodiment of the present disclosure.

FIG. 9 illustrates helical slits 132 according to an embodiment of the present disclosure.

As illustrated in FIG. 9, the helical slits 132, according to an embodiment, may be helically formed on the outer periphery of the rotor 10 around the axis of rotation of the rotor 10.

As can be readily predicted by those having ordinary skill in the art, the helical slits 132 formed along the outer periphery of the rotor 10 may provide a rotational vibration reduction effect, as is normally the case with slits skewed on the outer periphery of the rotor 10 at an angle to the axis of rotation.

The helical slits 132 may be made through opposite sides of the rotor 10, or the helical slits 132 may be formed in such a way that both ends thereof are positioned between opposite sides of the rotor 10. In the latter case, the helical slits 132 may be tapered in depth at both ends and seamlessly connect to unmachined parts of the outer periphery of the rotor 10.

Figure 10A:
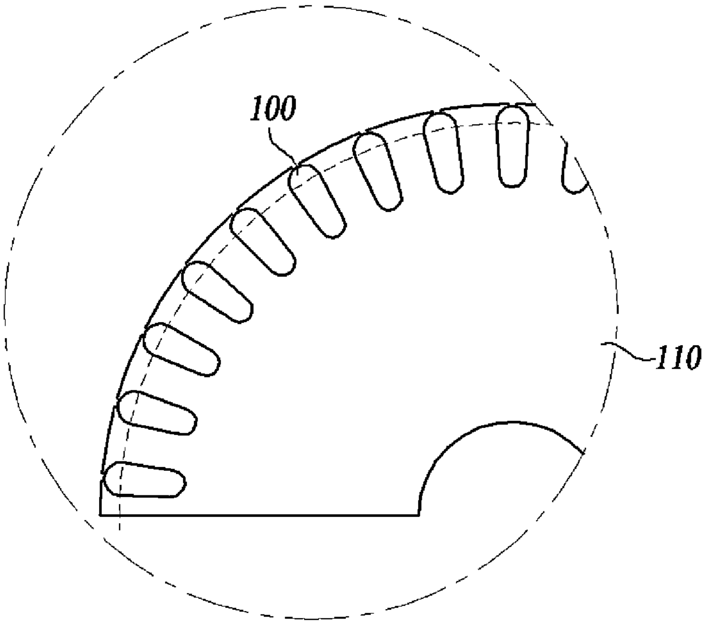
FIGS. 10A and 10B illustrate side cross-sectional views of a slit structure according to an embodiment of the present disclosure.
Figure 10B:
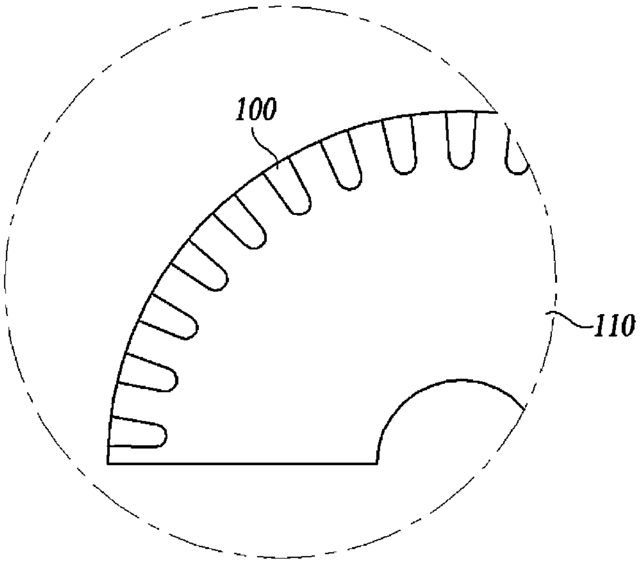

FIGS. 10A and 10B illustrate a side cross-sectional view of a slit structure according to an embodiment of the present disclosure.

FIGS. 10A and 10B illustrate a slit structure used in simulation (3D FEA) for examining characteristic changes in the induction motor caused by the slits 130 arranged parallel to one another according to an embodiment. FIG. 10A represents a part where the slits 130 are not formed (referred to as a base for convenience, meaning a region where the slits 130 are not formed). FIG. 10B represents a part where the slits 130 according to an embodiment are formed. For example, the ratio of the width of a unit base to the width of a unit slit with respect to the axis of the rotor 10 may be 8:2. An analysis was carried out under a varying slip condition, assuming that the phase current supplied to the stator (not shown) is 3 Arms. In the analysis, copper losses in the stator and the rotor 10 were considered.

Figure 11:
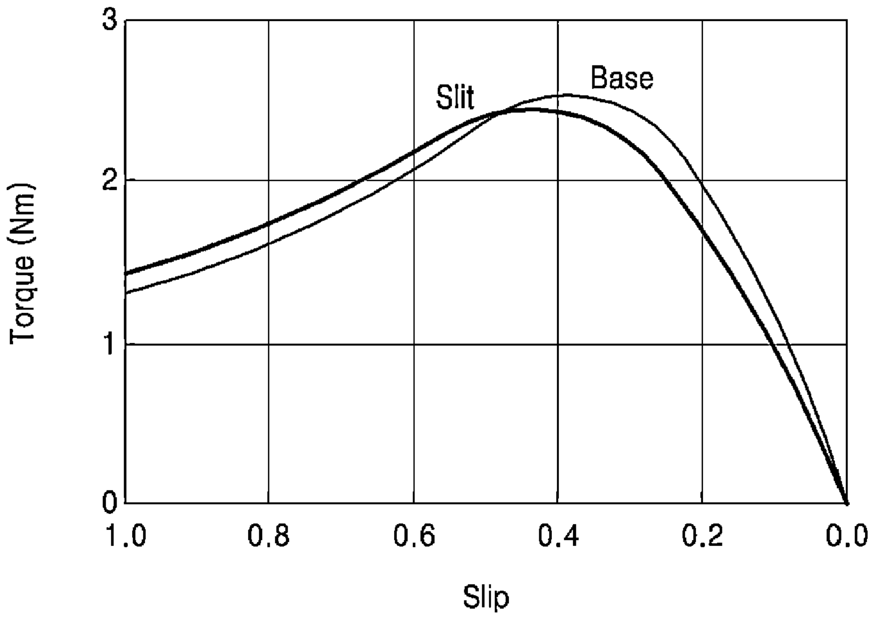
FIG. 11 shows slip-torque characteristics of an induction motor according to an embodiment of the present disclosure.

FIG. 11 shows slip-torque characteristics of an induction motor according to an embodiment of the present disclosure.

Referring to FIG. 11, an induction motor comprising a squirrel-cage rotor with circumferential slits 130, according to an embodiment of the present disclosure, exhibited an increase in starting torque. Even though the maximum value of torque and the slip at which maximum torque is produced decrease slightly, the high starting torque of the induction motors for vehicles may be advantageous in terms of performance and efficiency since they start and stop frequently during operation compared to induction motors for general purposes which run at a constant speed.

Figure 12:
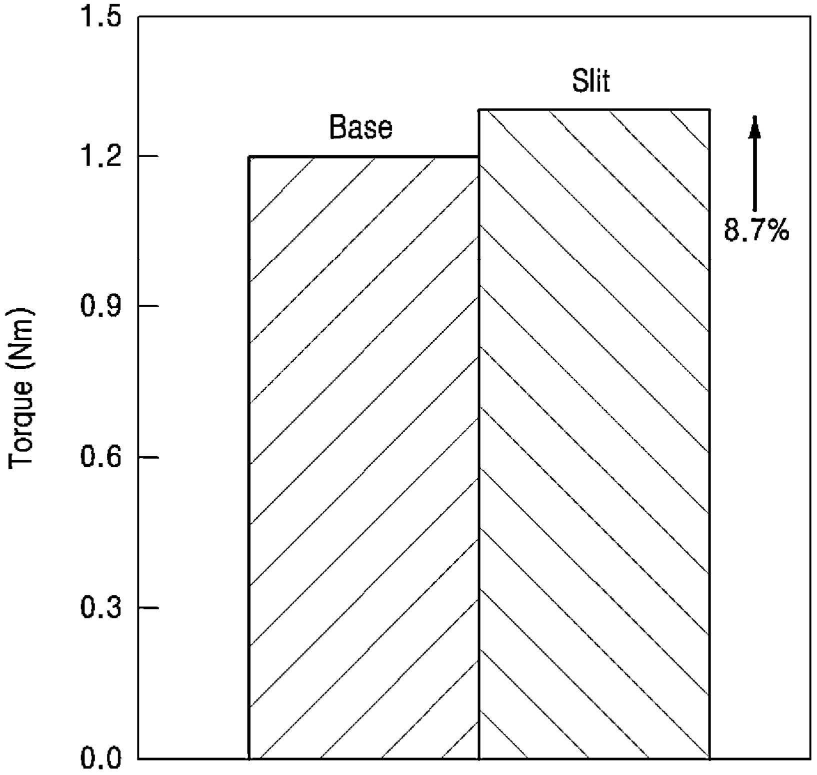
FIG. 12 shows an improvement in torque characteristics of an induction motor according to an embodiment of the present disclosure.
Figure 13:
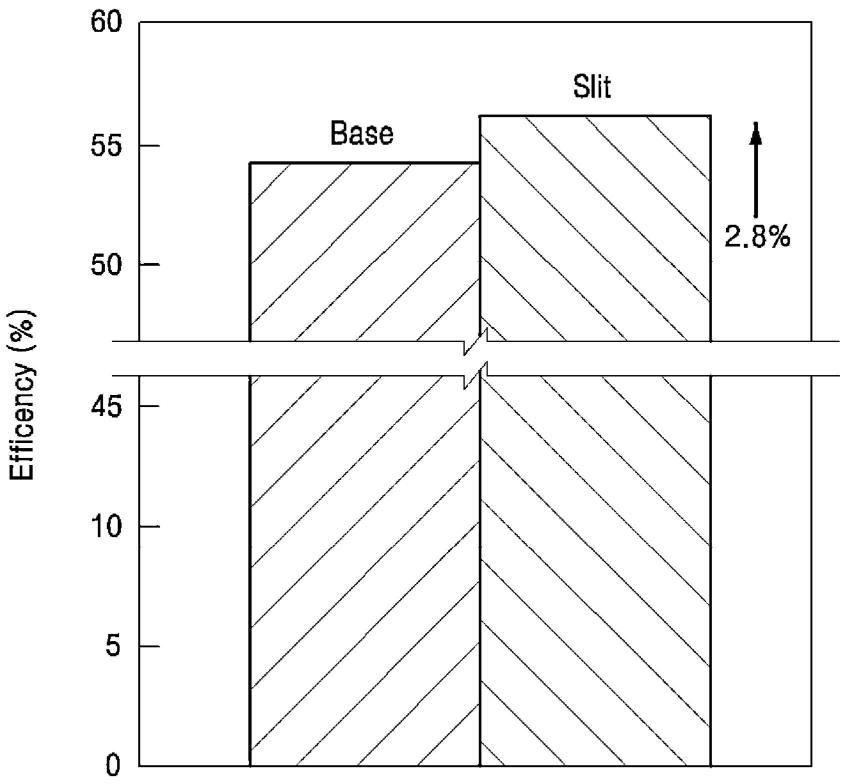
FIG. 13 shows an improvement in the efficiency of an induction motor according to an embodiment of the present disclosure.

FIG. 12 shows an improvement in torque characteristics of an induction motor according to an embodiment of the present disclosure. FIG. 13 shows an improvement in the efficiency of an induction motor according to an embodiment of the present disclosure.

Referring to FIG. 12, a slit model exhibited an increase of about 8.7% in torque at startup compared to a base model. Referring to FIG. 13, the slit model exhibited an increase of 2.8% in torque at startup.

In the induction motor, according to an embodiment, the slits 130 formed on the outer periphery of the conductor bars 100 increase the surface area of the conductor bars 100 along the length of the conduction bars 100. Therefore, the slits 130 lengthen the path in which currents induced by a magnetic flux in a high slip state flow, thus virtually leading to an increase in resistance and, consequently, an increase in starting torque. The depth of the slits 130 may be selected by considering the amount of slip required to increase starting torque and the depth of the path of a main magnetic flux for that slip.

The rotor 10, according to an embodiment, has a significantly increased surface area on the outer periphery by comprising slits 130 on the outer periphery. Induction motors, which have the issue of large amounts of heat generation in the rotor 10 compared to synchronous motors, may achieve an improvement in cooling characteristics by the increase in surface area caused by the slits 130. Accordingly, the induction motor, according to an embodiment, may provide improvements in overall torque performance as well as in starting torque. Moreover, since the slits 130 according to an embodiment may be made in a post-machining process, the starting characteristics may be improved without redesigning the conductor bars 100. In addition, in the case of a rotor with no identical slits, the starting characteristics may be variously implemented by easily adjusting the width, depth, and intervals of the slits 130.

Figure 14A:
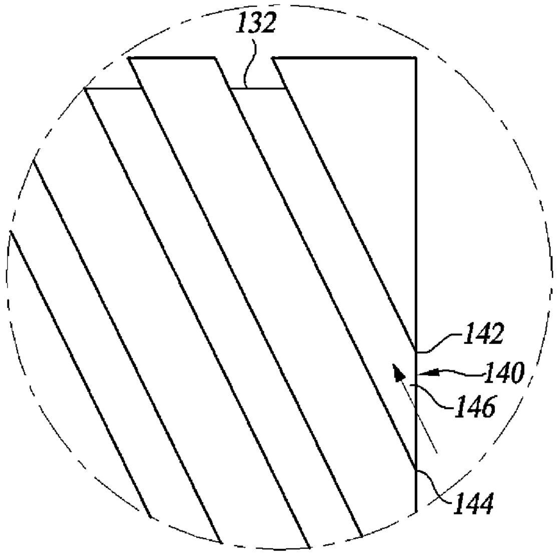
FIGS. 14A and 14B show a structure of one end of a helical slit for improving cooling characteristics according to a further embodiment of the present disclosure.
Figure 14B:
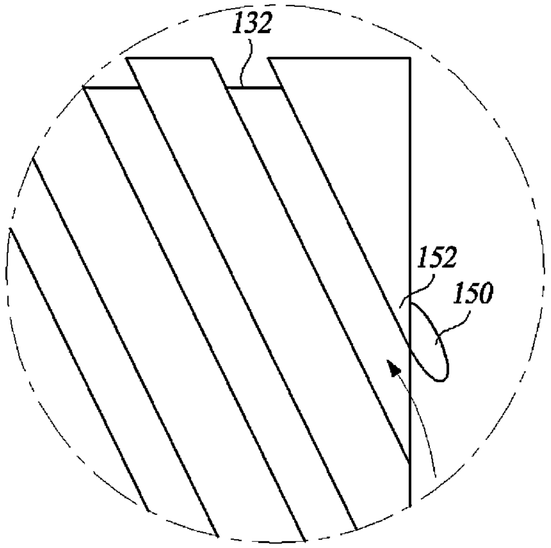

FIGS. 14A and 14B show a structure of one end of a helical slit 132 for improving cooling characteristics according to a further embodiment of the present disclosure.

The helical slit 132, according to an embodiment, may provide an additional improvement in the cooling of the rotor 10 since the helical slit 132 has a slit opening 140 on opposite sides of the rotor 10. Refrigerant from the outside may enter through the slit opening 140 formed on one side of the rotor 10.

The slit opening 140 includes: a first edge 142 where the direction of helix of the helical slit 132 forms an acute angle with a side of the rotor 10; a second edge 144 where the direction of helix of the helical slit 132 forms an obtuse angle with the side of the rotor 10; and a third edge 146 where a bottom surface of the helical slit 132 and the side of the rotor 10 meet.

Refrigerant supplied to one side of the rotor 10 from which the first edge 142 is skewed in the direction of rotation of the rotor 10 may be smoothly supplied into the helical slit 132. To facilitate the entry of refrigerant into the helical slit 132, the rotor 10 may further include a protrusion 150 protruding from a side portion 152 of the rotor 10 contiguous to the first edge 142. In other words, the end-rings 120 may include a protrusion 150 in some region.

Alternatively, a threaded hole (not shown) may be formed in the side portion 152 of the end-ring 120 where the protrusion 150 is to be included, and a separate member corresponding to the protrusion 150 may be fastened into the threaded hole. For example, the separate member may be a bolt (not shown), and a head of the bolt may serve as the protrusion.

The protrusion 150 may be formed in such a way that, as the rotor 10 rotates, external air including refrigerant is introduced into the helical slit 132. The overall torque performance of induction motors may be enhanced by improving the cooling efficiency of the rotor 10.

Although one embodiment discloses conductor bars 100 arranged in a row along the circumference of the rotor 10, the present disclosure is not limited to this, and slits may be formed on the outer periphery of a double squirrel-cage rotor.

Although embodiments of the present disclosure have been described for illustrative purposes, those having ordinary skill in the art should appreciate that various modifications, additions, and substitutions are possible, without departing from the idea and scope of the claimed disclosure. Therefore, embodiments of the present disclosure have been described for the sake of brevity and clarity. The scope of the technical idea of the present embodiments is not limited by the illustrations. Accordingly, one of ordinary skill in the art would understand that the scope of the claimed disclosure is not to be limited by the above explicitly described embodiments but by the claims and equivalents thereof.

What is claimed is:

1. A rotor for an induction motor, the rotor comprising:

a core built with stacks of a plurality of steel sheets and comprising a plurality of rotor slots that are radially arranged;

a plurality of conductor bars contained in the plurality of rotor slots, respectively; and end-rings attached to both longitudinal ends of each of the plurality of conductor bars, wherein the rotor further comprises at least one slit formed inward from an outer periphery of the rotor along a perimeter of the rotor, wherein the slit has a depth deep enough to form a groove portion in at least some region of each of the plurality of conductor bars, wherein the slit is a helical slit which is formed along a helical path around an axis of rotation of the rotor, wherein the helical slit is formed on the outer periphery of the core, wherein the helical slit comprises a slit opening formed through opposite sides of the rotor past the end-rings, wherein the slit opening comprises:

a first edge where a direction of helix of the helical slit forms an acute angle with a side of the rotor;

a second edge where the direction of helix of the helical slit forms an obtuse angle with the side of the rotor; and a third edge where a bottom surface of the helical slit and the side of the rotor meet, and wherein the slit opening further comprises a protrusion protruding from a side portion of the rotor contiguous to the first edge.

2. The rotor of claim 1, wherein the helical slit is formed so that both ends thereof are positioned between opposite sides of the rotor, and depth and/or cross-sectional area of the helical slit is gradually reduced.

3. The rotor of claim 1, wherein the side portion of the rotor contiguous to the first edge comprises a threaded hole, and the protrusion is fastened into the threaded hole.

4. The rotor of claim 3, wherein the protrusion is a head of a bolt screwed into the threaded hole.

* * * * *